United States Patent
Buter et al.

(10) Patent No.: US 11,071,307 B2
(45) Date of Patent: Jul. 27, 2021

(54) PROCESS OF COMPACTING A MICROPOROUS FAT POWDER AND COMPACTED POWDER SO OBTAINED

(71) Applicant: UPFIELD US INC., Englewood Cliffs, NJ (US)

(72) Inventors: René Joachim Buter, SL Vlaardingen (NL); Albert Korres, AT Vlaardingen (NL); Teunis de Man, Maassluis (NL)

(73) Assignee: Upfield Europe B.V., Rotterdam (NL)

( * ) Notice: Subject to any disclaimer, the term of this patent is extended or adjusted under 35 U.S.C. 154(b) by 0 days.

(21) Appl. No.: 16/245,077

(22) Filed: Jan. 10, 2019

(65) Prior Publication Data

US 2019/0142025 A1    May 16, 2019

Related U.S. Application Data

(62) Division of application No. 14/989,525, filed on Jan. 6, 2016, now Pat. No. 10,219,523, which is a division of application No. 13/993,202, filed as application No. PCT/EP2011/070933 on Nov. 24, 2011, now abandoned.

(30) Foreign Application Priority Data

Dec. 17, 2010   (EP) .................................... 10195655

(51) Int. Cl.
| | |
|---|---|
| A23D 7/04 | (2006.01) |
| A23D 7/00 | (2006.01) |
| A23D 9/05 | (2006.01) |
| A23D 9/00 | (2006.01) |
| A23D 9/02 | (2006.01) |
| A23L 33/115 | (2016.01) |
| A23D 9/04 | (2006.01) |

(52) U.S. Cl.
CPC .............. *A23D 7/04* (2013.01); *A23D 7/001* (2013.01); *A23D 9/00* (2013.01); *A23D 9/02* (2013.01); *A23D 9/04* (2013.01); *A23D 9/05* (2013.01); *A23L 33/115* (2016.08)

(58) Field of Classification Search
CPC . A23D 9/04; A23D 7/001; A23D 9/00; A23D 9/02; A23D 7/04; A23D 9/05; A23L 33/115
See application file for complete search history.

(56) References Cited

U.S. PATENT DOCUMENTS

| | | | |
|---|---|---|---|
| 2,521,219 A | 9/1950 | Holman et al. | |
| 2,521,242 A | 9/1950 | Mitchell, Jr. | |
| 2,615,160 A | 10/1952 | Baur | |
| 2,815,286 A | 12/1957 | Andre et al. | |
| 2,892,880 A | 6/1959 | Höhn | |
| 3,059,694 A | 10/1962 | Sietsema | |
| 3,120,438 A | 2/1964 | McIntire et al. | |
| 3,170,799 A | 2/1965 | Feuge | |
| 3,270,040 A | 8/1966 | Bradshaw | |
| 3,295,986 A | 1/1967 | Saslaw et al. | |
| 3,338,720 A | 8/1967 | Pichel | |
| 3,392,880 A | 7/1968 | Wilcek | |
| 3,425,843 A | 2/1969 | Japikse | |
| 3,433,650 A | 3/1969 | Block et al. | |
| 3,528,823 A | 9/1970 | Rossen | |
| 3,607,305 A | 9/1971 | Westenberg | |
| 3,634,100 A | 1/1972 | Fondu et al. | |
| 3,881,005 A | 4/1975 | Thakkar et al. | |
| 3,892,880 A | 7/1975 | Grolitsch | |
| 4,021,582 A | 5/1977 | Hsu | |
| 4,160,850 A | 7/1979 | Hallstrom et al. | |
| 4,226,894 A | 10/1980 | Gawrilow | |
| 4,232,052 A | 11/1980 | Nappen | |
| 4,234,577 A | 11/1980 | Zilliken | |
| 4,234,606 A | 11/1980 | Gawrilow | |

(Continued)

FOREIGN PATENT DOCUMENTS

| | | |
|---|---|---|
| AR | 10253193 | 6/2004 |
| AU | 2004262853 | 6/2008 |

(Continued)

OTHER PUBLICATIONS

Lopez et al., Milk fat and primary fractions obtained by dry fractionation 1. Chemical composition and crystallisation properties, Chemistry and Physics of Lipids, Oct. 2006, pp. 17-33, vol. 144, Issue 1.
Lowe, Experimental Cookery, Experimental Cookery, 1955, pp. 270-273, 4th edition, ., US.
M. Dervisoglu and F. Yazici, The Effect of Citrus Fibre on the Physical, Chemical and Sensory Properties of Ice Cream, Food Science and Technology International, Apr. 2006, pp. 159-164—with abstract, 12.
Margarines and Shortenings, Ullmanns Encyclopedia of Industrial Chemistry, 1990, pp. 156-158, vol. A16.
Micaleff et al, Beyond blood lipids phytosterols statins and omega-3 polyunsaturated fatty acid therapy for hyperlipidemia, Journal of Nutrional Biochemsitry, 2009, pp. 927-939; XP026755870, vol. 20.

(Continued)

*Primary Examiner* — Subbalakshmi Prakash
(74) *Attorney, Agent, or Firm* — Arent Fox LLP

(57) ABSTRACT

The invention relates to a compacted microporous fat powder that can suitably be used as an oil structuring agent. The compacted microporous fat powder has a freely settled density in the range of 90-600 g/l; a particle size distribution with at least 90 vol. % of the particles having a diameter in the range of 20 to 600 μm; a maximum $G'_i/G'_d$ ratio of more than 2.0, wherein G' represents the elastic modulus at 10° C. of a dispersion of 2 wt. % of the compacted fat powder in glycerol, and wherein the maximum ratio is determined by recording $G'_i$ whilst increasing the frequency from 0.1 to 15 s$^{-1}$, by subsequently recording $G'_d$ whilst decreasing said frequency from 15 to 0.1 s$^{-1}$ and by calculating the ratio $G'_i/G'_d$ at the frequency at which said ratio is highest.

12 Claims, No Drawings

(56) References Cited

U.S. PATENT DOCUMENTS

| | | |
|---|---|---|
| 4,288,460 A | 9/1981 | Ciliberto et al. |
| 4,292,338 A | 9/1981 | Ainger et al. |
| 4,294,862 A | 10/1981 | Wilke |
| 4,308,288 A | 12/1981 | Hara et al. |
| 4,341,813 A | 7/1982 | Ward |
| 4,366,181 A | 12/1982 | Dijkshoom et al. |
| 4,375,483 A | 3/1983 | Shuford et al. |
| 4,385,076 A | 5/1983 | Crosby |
| 4,388,339 A | 6/1983 | Lomneth et al. |
| 4,390,561 A | 6/1983 | Blair et al. |
| 4,391,838 A | 7/1983 | Pate |
| 4,469,710 A | 9/1984 | Rielley et al. |
| 4,486,457 A | 12/1984 | Schijf et al. |
| 4,501,764 A | 2/1985 | Gercama et al. |
| 4,578,274 A | 3/1986 | Sugisawa et al. |
| 4,826,699 A | 5/1989 | Soe |
| 4,855,157 A | 8/1989 | Tashiro et al. |
| 4,889,740 A | 12/1989 | Price |
| 4,917,915 A | 4/1990 | Cain et al. |
| 4,933,192 A | 6/1990 | Darling et al. |
| 4,990,355 A | 2/1991 | Gupta et al. |
| 5,127,953 A | 7/1992 | Hamaguchi |
| 5,130,156 A | 7/1992 | Bergquist et al. |
| 5,185,173 A | 2/1993 | Bethke et al. |
| 5,186,866 A | 2/1993 | Ryuo et al. |
| 5,302,408 A | 4/1994 | Cain et al. |
| 5,352,475 A | 10/1994 | Tholl |
| 5,374,445 A | 12/1994 | Havenstein et al. |
| 5,391,382 A | 2/1995 | Chappel |
| 5,429,836 A | 7/1995 | Fuisz |
| 5,447,735 A | 9/1995 | Miller |
| 5,451,421 A | 9/1995 | Tanihara et al. |
| 5,516,543 A | 5/1996 | Amankonah et al. |
| 5,620,734 A | 4/1997 | Wesdorp et al. |
| 5,707,670 A | 1/1998 | Mehansho et al. |
| 5,858,445 A | 1/1999 | Huizinga et al. |
| 5,866,192 A | 2/1999 | Uesugi et al. |
| 5,904,949 A | 5/1999 | Reddy et al. |
| 5,916,608 A | 6/1999 | Lanting et al. |
| 5,916,808 A | 6/1999 | Kole et al. |
| 5,972,412 A | 10/1999 | Sassen et al. |
| 5,985,350 A | 11/1999 | Gubler et al. |
| 6,020,003 A | 2/2000 | Stroh et al. |
| 6,031,118 A | 2/2000 | van Amerongen et al. |
| 6,056,791 A | 5/2000 | Weidner et al. |
| 6,077,558 A | 6/2000 | Euber |
| 6,106,885 A | 8/2000 | Huizinga et al. |
| 6,106,886 A | 8/2000 | van Amerongen et al. |
| 6,117,475 A | 9/2000 | van Amerongen et al. |
| 6,117,478 A | 9/2000 | Dubberke |
| 6,129,944 A | 10/2000 | Tiainen et al. |
| 6,156,370 A | 12/2000 | Huizinga et al. |
| 6,159,525 A | 12/2000 | Lievense et al. |
| 6,171,636 B1 | 1/2001 | Sassen et al. |
| 6,187,578 B1 | 2/2001 | Blinkovsky et al. |
| 6,190,680 B1 | 2/2001 | Sakurada et al. |
| 6,214,406 B1 | 4/2001 | Reimerdes |
| 6,217,920 B1 | 4/2001 | van Eendenburg et al. |
| 6,238,723 B1 | 5/2001 | Sassen et al. |
| 6,248,389 B1 | 6/2001 | Biller et al. |
| 6,284,302 B1 | 9/2001 | Berger et al. |
| 6,312,752 B1 | 11/2001 | Lansbergen et al. |
| 6,316,030 B1 | 11/2001 | Kropf et al. |
| 6,322,842 B1 | 11/2001 | Reddy et al. |
| 6,352,737 B1 | 3/2002 | Dolhaine et al. |
| 6,395,324 B1 | 5/2002 | Effey et al. |
| 6,403,144 B1 | 6/2002 | El-Khoury et al. |
| 6,423,326 B1 | 7/2002 | Shapiro |
| 6,423,363 B1 | 7/2002 | Traska et al. |
| 6,440,336 B1 | 8/2002 | Weinreich et al. |
| 6,468,578 B1 | 10/2002 | Bodor et al. |
| 6,531,173 B2 | 3/2003 | Brooker |
| 6,533,252 B1 | 3/2003 | Bernard et al. |
| 6,582,749 B2 | 6/2003 | Merrick et al. |
| 6,616,849 B1 | 9/2003 | Osajima et al. |
| 6,743,450 B2 | 6/2004 | Romanczyk, Jr. et al. |
| 6,753,032 B1 | 6/2004 | Hirokawa et al. |
| 6,800,317 B2 | 10/2004 | Wester et al. |
| 6,808,737 B2 | 10/2004 | Ullanoormadam |
| 6,827,964 B2 | 12/2004 | Wester et al. |
| 6,929,816 B2 | 8/2005 | Wester |
| 6,986,846 B2 | 1/2006 | Shekunov et al. |
| 6,986,886 B2 | 1/2006 | Hammond et al. |
| 7,056,949 B2 | 6/2006 | Koike et al. |
| 7,118,773 B2 | 10/2006 | Floeter et al. |
| 7,223,435 B2 | 5/2007 | Besselink et al. |
| 7,575,768 B2 | 8/2009 | Perlman et al. |
| 7,601,184 B2 | 10/2009 | Tischendorf |
| 7,618,670 B2 | 11/2009 | Ullanoormadam |
| 7,807,208 B2 | 10/2010 | Ullanoormadam |
| 7,862,751 B2 | 1/2011 | Foster et al. |
| 8,025,913 B2 | 9/2011 | van den Berg et al. |
| 8,124,152 B2 | 2/2012 | Janssen et al. |
| 8,147,895 B2 | 4/2012 | Barendse et al. |
| 8,211,470 B2 | 7/2012 | Kim |
| 8,431,370 B2 | 4/2013 | ten Brink et al. |
| 8,586,122 B2 | 11/2013 | McNeill et al. |
| 8,865,245 B2 | 10/2014 | Den Adel et al. |
| 8,927,045 B2 | 1/2015 | Barendse et al. |
| 8,940,355 B2 | 1/2015 | van den Berg et al. |
| 10,219,523 B2 | 3/2019 | Buter et al. |
| 2001/0029047 A1 | 10/2001 | Liu et al. |
| 2002/0034577 A1 | 3/2002 | Vogensen et al. |
| 2002/0048606 A1 | 4/2002 | Zawistowski |
| 2002/0076476 A1 | 6/2002 | Kuil et al. |
| 2002/0132035 A1 | 9/2002 | Tamarkin et al. |
| 2002/0168450 A1 | 11/2002 | Drudis et al. |
| 2003/0064141 A1 | 4/2003 | Brooker |
| 2003/0068425 A1 | 4/2003 | Khare |
| 2003/0124228 A1 | 7/2003 | Goto et al. |
| 2003/0124288 A1 | 7/2003 | Merziger et al. |
| 2003/0165572 A1 | 9/2003 | Auriou |
| 2003/0203854 A1 | 10/2003 | Pischel et al. |
| 2004/0076732 A1 | 4/2004 | Valix |
| 2004/0101601 A1 | 5/2004 | Loh et al. |
| 2004/0105931 A1 | 6/2004 | Basheer et al. |
| 2004/0126475 A1 | 7/2004 | Hashizume et al. |
| 2004/0166204 A1 | 8/2004 | Smith et al. |
| 2004/0197446 A1 | 10/2004 | Haynes et al. |
| 2005/0014158 A1 | 1/2005 | Adam et al. |
| 2005/0069619 A1 | 3/2005 | Bot et al. |
| 2005/0069625 A1 | 3/2005 | Chimel et al. |
| 2005/0123667 A1 | 6/2005 | Sakuma et al. |
| 2005/0170062 A1 | 8/2005 | Burling et al. |
| 2005/0175745 A1 | 8/2005 | Zawistowski |
| 2005/0196512 A1 | 9/2005 | Nakhasi et al. |
| 2005/0271791 A1 | 12/2005 | Wright et al. |
| 2006/0019021 A1 | 1/2006 | Plank et al. |
| 2006/0035871 A1 | 2/2006 | Auweter et al. |
| 2006/0051479 A1 | 3/2006 | Chiavazza et al. |
| 2006/0115553 A1 | 6/2006 | Gautam et al. |
| 2006/0280855 A1 | 12/2006 | Van Den Berg et al. |
| 2007/0054028 A1 | 3/2007 | Perlman et al. |
| 2007/0087085 A1 | 4/2007 | Sarma et al. |
| 2007/0154617 A1 | 7/2007 | Lansbergen |
| 2007/0254088 A1 | 11/2007 | Stewart et al. |
| 2007/0286940 A1 | 12/2007 | Herzing et al. |
| 2008/0089978 A1 | 4/2008 | Grigg et al. |
| 2008/0187645 A1 | 8/2008 | Ekblom et al. |
| 2008/0193628 A1 | 8/2008 | Garbolino et al. |
| 2008/0193638 A1 | 8/2008 | McMaster et al. |
| 2008/0226786 A1 | 9/2008 | Ward et al. |
| 2008/0268130 A1 | 10/2008 | Bons et al. |
| 2008/0274175 A1 | 11/2008 | Schramm et al. |
| 2008/0317917 A1 | 12/2008 | Janssen et al. |
| 2009/0022868 A1 | 1/2009 | Van Den Bremt et al. |
| 2009/0029024 A1 | 1/2009 | McNeill et al. |
| 2009/0041898 A1 | 2/2009 | Garbolino et al. |
| 2009/0123633 A1 | 5/2009 | Cleenewerck et al. |
| 2009/0136645 A1 | 5/2009 | Garbolino |
| 2009/0263559 A1 | 10/2009 | Van Horsen et al. |
| 2010/0040737 A1 | 2/2010 | Radlo et al. |
| 2010/0159079 A1 | 6/2010 | Qvyjt |
| 2011/0070335 A1 | 3/2011 | Brugger et al. |

(56) References Cited

U.S. PATENT DOCUMENTS

| | | |
|---|---|---|
| 2011/0244111 A1 | 10/2011 | Den Adel et al. |
| 2011/0287156 A1 | 11/2011 | Perlman |
| 2011/0287160 A1 | 11/2011 | Dobenesque et al. |
| 2011/0311706 A1 | 12/2011 | van den Berg et al. |
| 2011/0311707 A1 | 12/2011 | Bezemer et al. |
| 2012/0018535 A1 | 1/2012 | Wubbolts et al. |
| 2013/0004522 A1 | 1/2013 | Dvir et al. |
| 2013/0115361 A1 | 5/2013 | Floter et al. |

FOREIGN PATENT DOCUMENTS

| | | |
|---|---|---|
| DE | 2253515 | 5/1974 |
| DE | 3220916 | 12/1983 |
| DE | 10253111 | 5/2004 |
| EA | 0505007 | 9/1992 |
| EA | 0327225 | 7/1993 |
| EP | 0021483 | 1/1981 |
| EP | 0041299 | 1/1983 |
| EP | 0089082 | 9/1983 |
| EP | 0063835 | 4/1985 |
| EP | 0237120 | 9/1987 |
| EP | 0294692 | 12/1988 |
| EP | 0327120 | 8/1989 |
| EP | 0393963 A2 | 4/1990 |
| EP | 0393963 | 10/1990 |
| EP | 0289069 | 3/1993 |
| EP | 0572051 | 12/1993 |
| EP | 0775444 | 5/1997 |
| EP | 0780058 | 6/1997 |
| EP | 0796567 | 9/1997 |
| EP | 0744992 | 10/1997 |
| EP | 0898896 | 3/1999 |
| EP | 0594152 | 2/2000 |
| EP | 1238589 | 9/2002 |
| EP | 0962150 | 8/2003 |
| EP | 1419698 | 5/2004 |
| EP | 1419811 | 5/2004 |
| EP | 1557090 | 7/2005 |
| EP | 1795257 | 6/2007 |
| EP | 1815752 | 8/2007 |
| EP | 1180545 | 9/2007 |
| EP | 1114674 | 9/2008 |
| EP | 2016834 | 1/2009 |
| EP | 1285584 | 11/2009 |
| EP | 1285584 B1 | 11/2009 |
| EP | 2123164 | 11/2009 |
| EP | 2181604 | 5/2010 |
| EP | 2181604 A1 | 5/2010 |
| EP | 1197153 | 3/2011 |
| EP | 1651338 | 5/2011 |
| EP | 0897671 | 7/2011 |
| EP | 1865786 | 11/2011 |
| FR | 2243653 | 4/1975 |
| FR | 2776167 | 9/1999 |
| GB | 1114674 | 5/1968 |
| GB | 1537011 | 12/1978 |
| GB | 1538958 | 1/1979 |
| GB | 2095966 | 10/1982 |
| GB | 2095968 | 10/1982 |
| GB | 2177283 | 1/1987 |
| GB | 2208296 | 3/1989 |
| GB | 2208378 | 11/1991 |
| GB | 2292949 | 3/1996 |
| GB | 2320175 | 6/1998 |
| JP | S5951742 | 3/1984 |
| JP | S62239949 | 10/1987 |
| JP | H2299544 | 12/1990 |
| JP | 2003210107 | 7/2003 |
| WO | WO9308699 | 5/1993 |
| WO | WO9521688 | 8/1995 |
| WO | WO9614755 | 5/1996 |
| WO | WO9619115 | 6/1996 |
| WO | WO9638047 | 12/1996 |
| WO | WO9742830 | 11/1997 |
| WO | WO9813133 | 4/1998 |
| WO | WO9847386 | 10/1998 |
| WO | WO9956558 | 11/1999 |
| WO | WO0009636 | 2/2000 |
| WO | WO0021490 | 4/2000 |
| WO | WO0045648 | 8/2000 |
| WO | WO0041491 | 12/2000 |
| WO | WO0100046 | 1/2001 |
| WO | WO0132035 | 5/2001 |
| WO | WO0143559 | 6/2001 |
| WO | WO0166560 | 9/2001 |
| WO | WO0191569 | 12/2001 |
| WO | WO0178529 | 3/2002 |
| WO | WO02100183 | 12/2002 |
| WO | WO03043430 | 5/2003 |
| WO | WO03084337 | 10/2003 |
| WO | WO03096817 | 11/2003 |
| WO | WO03103633 | 12/2003 |
| WO | WO2004068959 | 8/2004 |
| WO | WO2004093571 | 11/2004 |
| WO | WO2005014158 | 2/2005 |
| WO | WO2005051089 | 6/2005 |
| WO | WO2005071053 | 8/2005 |
| WO | WO2005074717 | 8/2005 |
| WO | WO2005074726 | 8/2005 |
| WO | WO2006005141 | 2/2006 |
| WO | WO2006066979 | 6/2006 |
| WO | WO2006079445 | 8/2006 |
| WO | WO2006087091 | 8/2006 |
| WO | WO2006087092 | 8/2006 |
| WO | WO2006087093 | 8/2006 |
| WO | WO2006134152 | 12/2006 |
| WO | WO2007022897 | 3/2007 |
| WO | WO2007024770 | 4/2007 |
| WO | WO2007039020 | 4/2007 |
| WO | WO2007039040 | 4/2007 |
| WO | WO2007096211 | 8/2007 |
| WO | WO2007096243 | 8/2007 |
| WO | WO2008125380 | 10/2008 |
| WO | WO2009068651 | 6/2009 |
| WO | WO2010053360 | 5/2010 |
| WO | WO2010060713 | 6/2010 |
| WO | WO2010069746 | 6/2010 |
| WO | WO2010069747 | 6/2010 |
| WO | WO2010069750 | 6/2010 |
| WO | WO2010069751 | 6/2010 |
| WO | WO2010069752 | 6/2010 |
| WO | WO2010069753 | 6/2010 |
| WO | WO2011160921 | 12/2011 |

OTHER PUBLICATIONS

Munuklu et al, Particle formation of an edible fat (rapeseed 70) using the supercritical melt micronization (ScMM) process, The Journal of Supercritical Fluids, Apr. 2007, pp. 433-442, vol. 40, Issue 3.

Munuklu et al., Supercritical Melt Micronization Using theParticles from Gas Saturated Solution Process, American Chemical Society Symposium, 2003, pp. 353-369.

Nathalie De Cock, Structure development in confectionery products: importance of triacylglycerol composition, Universiteit Gent Faculteit Bio-ingenieurswetenschappen, 2011, pp. 1-72.

Norizzah et al., Effects of chemical interesterification on physicochemical properties of palm stearin and palm kernel olein blends, Food Chemistry, 2004, pp. 229-235, 86.

Notice of Opposition from Feyecon Development & Implementation BV in EP06706499, Aug. 30, 2012.

Notice of Opposition from Kerry Group Services Intl Ltd in EP06706499, Aug. 30, 2012.

P. Munuklu, Particle formation of edible fats using the supercritical melt micronization process (ScMM), The Journal of Supercritical Fluids, 2007, pp. 181-190, 43.

Pernetti et al, Structuring of edible oils by alternatives to crystalline fat, Current Opinion in Colloid & Interface Science, Oct. 2007, pp. 221-231, vol. 12, Issues 4-5.

Ribeiro et al., Zero trans fats from soybean oil and fully hydrogenated soybean oil: Physico-chemical properties and food applications, Food Research International, 2009, pp. 401-410, vol. 42.

(56) References Cited

OTHER PUBLICATIONS

S. P. Kochhar, Influence of Processing on Sterols of Edible Vegetable Oils, Prog Lipid Res, 1983, pp. 161-188, vol. 22.
Search Report in EP03077247, dated Apr. 7, 2004.
Search Report in EP05075384, dated Jul. 5, 2005, EP.
Search Report in EP05075393, dated Jul. 20, 2005.
Search report in EP06122483, dated Jul. 15, 2008, EP.
Search Report in EP08172283, dated Jun. 5, 2009.
Search Report in EP08172284, dated Jun. 4, 2009, EP.
Search Report in EP08172286, dated May 20, 2009, EP.
Search Report in EP08172298, dated Apr. 9, 2009, EP.
Search Report in EP08172300, dated Jun. 5, 2009.
Search Report in EP08172304, dated May 28, 2009.
Search Report in EP10166774, dated Dec. 3, 2010.
Search Report in EP10181979, dated Nov. 17, 2010.
Search Report in EP10195564, dated May 20, 2011, EP.
Search Report in EP10195567, dated May 24, 2011.
Search Report in EP10195650, dated May 4, 2011.
Search Report in EP10195655, dated Jun. 15, 2011, EP.
Search Report in EP10196443, dated May 27, 2011.
Search Report in EP10196444, dated May 25, 2011.
Search Report in PCTEP2004006544, dated Jan. 28, 2005, WO.
Search Report in PCTEP2006000800, dated Aug. 2, 2006, WO.
Search Report in PCTEP2006000801, dated Aug. 11, 2006, WO.
Search Report in PCTEP2009066093, dated Mar. 17, 2010.
Search Report in PCTEP2009066095, dated Mar. 23, 2010, WO.
Search Report in PCTEP2009066098, dated Mar. 17, 2010.
Search Report in PCTEP2009066104, dated Jan. 14, 2010, WO.
Search Report in PCTEP2009066105, dated Jan. 28, 2010.
Search Report in PCTEP2009066107, dated Jan. 12, 2010, WO.
Search Report in PCTEP2011058922, dated Sep. 15, 2011.
Search Report in PCTEP2011065601, dated Oct. 21, 2011.
Search Report in PCTEP2011070933, dated Mar. 21, 2012, WO.
Search Report in PCTEP2011070948, dated Feb. 9, 2012, WO.
Search Report in PCTEP2011071150, dated Jan. 30, 2012.
Search Report in PCTEP2011071168, dated Feb. 9, 2012.
Search Report in PCTEP2011071282, dated Jan. 25, 2012.
Search Report in PCTEP2011071397, dated Feb. 9, 2012.
Shahidi et al., Margarine processing plants and equipment, Edible Oil and Fat Product, Margarine processing plants and equipment, 2005, pp. 502, 518.
Shurtleff et al., History of Soy Oil Hydrogenation and of Research on the Safety of Hydrogenated Vegetable Oils, SoyInfo Center, 2007, pp. 1-9.
Starches, Tate & Lyle Product Brochure, 2009, pp. 1-16.
Strawberry Powder Flavor GA1403, Strawberryflavor.com, 2005, p. 1.
The American Heritage Dictionary, 1982, p. 407, 1225, 2nd College Edition.
Turk et al., Micronization of pharmaceutical substances by the Rapid Expansion of Supercritical Solutions (RESS): a promising method to improve bioavailability of poorly soluble pharmaceutical agents, The Journal of Supercritical Fluids, Jan. 2002, pp. 75-84, vol. 22 Issue 1.
Van Den Enden et al., A Method for the Determination of the Solid Phase Content of Fats Using Pulse Nuclear Magnetic Resonance, Fette Seifen Anstrichmittel, 1978, pp. 180-186, vol. 80.
Van Den Enden et al., Rapid Determination of Water Droplet Size Distributions by PFG-N MR, Journal of Colloid and Interface Science, Nov. 1990, pp. 105-113, vol. 140 No. 1.
Van Den Enden, A Method for the Determin of the Solid Phase Content of Fats Using Pulse Nuclear Magnetic Resonance, Fette Seifen Anstrichmittel, 1978, 180, 5, US.
Von Bonsdorff et al, Optimizing the Crystal Size and Habit of I3-Sitosterol in Suspension, AAPS PharmSciTech, 2003, pp. 1-8, 4 (3).
Written Opinion in EP03077247, dated Apr. 7, 2004.
Written Opinion in EP05075384, Jul. 5, 2005.
Written Opinion in EP05075393, dated Jul. 20, 2005.

Written Opinion in EP06122483 (F7717EPDIVW1), dated Jul. 15, 2008, EP.
Written opinion in EP08172283, dated Jun. 5, 2009.
Written Opinion in EP08172284, dated Jun. 4, 2009, EP.
Written Opinion in EP08172286, dated May 20, 2009, EP.
written Opinion in EP08172298, dated Apr. 9, 2009, EP.
Written Opinion in EP08172300, dated Jun. 5, 2009.
Written Opinion in EP08172304, dated May 28, 2009.
Written Opinion in EP10166774, dated Dec. 3, 2010.
Written Opinion in EP10181979, dated Nov. 11, 2010.
Written Opinion in EP10195564, dated May 20, 2011, EP.
Written Opinion in EP10195567, dated May 24, 2011.
Written Opinion in EP10195655, dated Jun. 15, 2011.
Written Opinion in EP10196443, dated May 27, 2011.
Written Opinion in EP10196444, dated May 25, 2011, EP.
Written Opinion in PCTEP2004006544, dated Jan. 28, 2005, WO.
Written Opinion in PCTEP2006000800, dated Aug. 2, 2006, WO.
Written Opinion in PCTEP2006000801, dated Aug. 11, 2006.
Written Opinion in PCTEP2009066093, dated Mar. 17, 2010.
Written Opinion in PCTEP2009066095, dated Mar. 23, 2010, WO.
Written Opinion in PCTEP2009066098, dated Mar. 17, 2010.
Written Opinion in PCTEP2009066104, dated Jan. 14, 2010, WO.
Written Opinion in PCTEP2009066105, dated Jan. 28, 2010.
Written Opinion in PCTEP2009066107, dated Jan. 12, 2010, WO.
Written Opinion in PCTEP2011058922, dated Sep. 15, 2011.
Written Opinion in PCTEP2011065601, dated Oct. 21, 2011.
Written Opinion in PCTEP2011070933, dated Mar. 21, 2012, WO.
Written Opinion in PCTEP2011070948, dated Feb. 9, 2012, WO.
Written Opinion in PCTEP2011071150, dated Jan. 30, 2012.
Written Opinion in PCTEP2011071168, dated Feb. 9, 2012.
Written Opinion in PCTEP2011071282, dated Jan. 25, 2012.
Written Opinion in PCTEP2011071397, dated Feb. 9, 2012.
Nutrition: Today's challenges and opportunities, Leatherhead Food International, Jun. 2008, pp. 1-6, vol. 42 No. 5, US.
The prilling process with liquid nitrogen, Jet Priller, Jun. 23, 2010, pp. 1-2, ., Linde, US.
Anna Von Bonsdorff-Nikander, Studies on a Cholesterol-Lowering Microcrystalline Phystosterol Suspension in Oil, Division of Pharmaceutical Technology Faculty of Pharmacy, Feb. 12, 2005, 12, 28-30, 35-44.
Anonymous, Particle Sizes of Milk Powders Part I, Dairy Products Technolgoy Center Dairy Ingredients Applications Apr. 2000, pp. 1-2, vol. 2 No. 4.
Belitz et al., Milk and Dairy Products, Food Chemistry, 1999, pp. 470-474 and pp. 497-498XP002264854.
Charteris et al., Edible table (bio) spread containing potentially probiotic Lactobacillus and Bifidobacterium International Journal of Dairy Technology, Feb. 2002, pp. 44-56XP002635276, vol. 55 No. 1.
Christiansen et al., Cholesterol-lowering effect of spreads enriched with microcrystalline plant sterols in hypercholesterolemic subject, European Journal of Nutrition, 2001, 66-73, 40.
Christoph et al., Glycerol, Ullmann's Encyclopedia of Industrial Chemistry, 2012, pp. 67-82. NB: only relevant pp. 67-69 and 79., vol. 17, Wiley-VCH Verlag GmbH & Co. KGaA, Weinheim.
D. Chapman, The Polymorphism of Glycerides, University Chemical Laboratory Chemical Reviews, Dec. 2, 1961, pp. 433-456, 62.
De Graaf et al., Consumption of tall oil-derived phytosterols in a chocolate matrix significantly decreases plasma total and low-density lipoprotein-cholesterol levels, British Journal of Nutrition, 2002, pp. 479-488.
Experimental and Analytical Facilities, Delft University of Technology, Dec. 16, 2005, pp. 41-51.
Ferguson et al., The Polymorphic Forms or Phases of Triglyceride Fats, Chemical Reviews, 1941, pp. 355-384.
Fischer, Formulation challenges in Ice Cream Gelling and thickening systems and their applications fruit preparations, Food Ingredients and Analysis International, 2001, pp. 29-31, vol. 73 No. 3.
Fischer, Improved fruit fibres for modern food processing, Food Ingredients and Analysis International, 2001, pp. 29-31, vol. 23 No. 3.

(56) References Cited

OTHER PUBLICATIONS

Formo et al., Bailey's Industrial Oil and Fat Products, Bailey's Industiral Oil and Fat Products, 1979, pp. 317, 326, 377, 382, 398, vol. 1 4th Edition.

Formo et al., Composition and Characteristics of Individual Fats and Oils, Bailey's Industrial Oil and Fat Products, 1979, pp. 382-384, vol. 1 4th Edition.

Garti et al., Stabilization of Water-in-Oil Emulsions by Submicrocrystalline a-Form Fat Particles, JAOCS Journal of the American Oil Chemists' Society, 1998, pp. 1825-1831 XP002164689, vol. 75 No. 12.

Gerber et al., Effect of Process-Parameters on Particles Obtained by the Rapid Expansion of Supercritical Solutions, World Congress on Oil Particle Technology, 1998, pp. 1-11 XP001080632.

Gunstone et al., Analytical Methods Slip Point, The Lipid Handbook, 1994, pp. 321-322, 2nd Edition.

Gunstone et al., Food uses of oils and fats, The Lipid Handbook, 2007, pp. 336-341, 3rd Edition.

Gunstone et al., Occurrence and characterisation of oils and fats, The Lipid Handbook, 2007, pp. 49-53, 3rd Edition.

Gunstone et al., Occurrence and Characterisation of Oils and Fats, The Lipid Handbook, 2007, pp. 51, 55, 63, 66, 67, 3rd Edition.

Gunstone et al., Polymorphism and nomenclature of lipid crystal forms, The Lipid Handbook, 1995, pp. 405, 2nd Edition.

Gunstone, Lipids in Foods, Lipids in Foods Chemistry, Biochemistry and Technology, 1983, pp. 154.

Hasenhuettl et al., Starch, Food Emulsifiers and Their Applications, 2007, pp. 274-275, Second Edition.

Hayes et al, Nonesterified Phytosterols Dissolved and Recrystallized in Oil Reduce Plasma Cholesterol in Gerbils and Humans, The journal of Nutrition, Jun. 1, 2006, pp. 1395-1399, 134 No. 6, US.

Hui, Bailey's Industrial Oil and Fat Products, Bailey's Industrial Oil and Fat Products, 1996, pp. 484-485, 1-5th edition, US.

Hydrogenation, Wikipedia, pp. 1-10.

Interesterified Fat, Wikipedia, pp. 1-4.

IPRP 1 in PCTEP2011071150, Feb. 25, 2013.

IPRP in PCTEP2009066104, Sep. 28, 2010, WO.

IPRP in PCTEP2009066105, Mar. 24, 2011.

IPRP in PCTEP2011071150, Apr. 23, 2013.

IPRP1 in PCTEP2009066093, Jun. 21, 2011.

IPRP1 in PCTEP2009066098, Jun. 21, 2011.

IPRP1 in PCTEP2009066107, Jun. 21, 2011.

IPRP1 in PCTEP2011070933, Jun. 18, 2013.

IPRP2 in PCTEP2004006544, Jan. 3, 2006, WO.

IPRP2 in PCTEP2006000800 (F7817WOORD), Jun. 27, 2007, WO.

IPRP2 in PCTEP2006000801, Mar. 20, 2007.

IPRP2 in PCTEP2009066095, Mar. 24, 2011, WO.

IPRP2 in PCTEP2009066105, Mar. 24, 2011.

IPRP2 in PCTEP2011065601, Sep. 24, 2012, WO.

IPRP2 in PCTEP2011070948, Mar. 11, 2013, WO.

IPRP2 in PCTEP2011071168, Sep. 5, 2012.

IPRP2 in PCTEP2011071397, Mar. 21, 2013.

IRPR2 in PCTEP2011058922, Jul. 6, 2012.

Johansson et al., Water-in-Triglyceride Oil Emulsions. Effect of Fat Crystals on Stability, JAOCS Journal of the American Oil Chemists' Society, 1995, pp. 939-950, vol. 72 No. 8.

K. Davidsson, Powdered fats for soups and sauces—and a range of other food products, Food Ingredients and Analysis International, 2001, pp. 29-30, 23 (4).

Lipson et al., Analysis of the Broadening of Powder Lines, Interpretation of X-Ray Powder Diffraction Patterns, 1970, pp. 244-263.

PROCESS OF COMPACTING A MICROPOROUS FAT POWDER AND COMPACTED POWDER SO OBTAINED

This is a divisional application of Ser. No. 14/989,525 filed Jan. 6, 2016, which is a divisional application of Ser. No. 13/993,202 filed Jun. 11, 2013, which is a national phase entry of PCT/EP2011/070933 filed Nov. 24, 2011, which claims priority to European application 10195655.5 filed Dec. 17, 2010, the entire contents of each of which is hereby incorporated by reference in its entirety.

TECHNICAL FIELD OF THE INVENTION

The present invention relates to a process of compacting a microporous fat powder, notably a microporous fat powder that can suitably be used as an oil structuring agent. The process comprises feeding the fat powder into the feed zone of an extruder having a forwarding screw and a barrel in which said screw is positioned; rotating said forwarding screw to advance said fat powder feed through a compacting zone of the extruder; and expelling the compacted fat powder from the extruder.

The invention further provides a compacted microporous fat powder having oil structuring properties and a process for the preparation of an oil containing foodstuff comprising such a compacted fat powder.

BACKGROUND OF THE INVENTION

Fat continuous food products are well known in the art and include, for example, shortenings comprising a fat phase and water-in-oil emulsions such as spreads, butter, kitchen margarines and bakery margarines.

The fat phase of these products usually comprises a mixture of liquid oil (i.e. fat that is liquid at ambient temperature) and fat which is solid at ambient temperatures. The solid fat, also called structuring fat or hardstock fat, serves to structure the fat phase and helps to stabilize the aqueous phase, if present, by forming a fat crystal network.

Shortenings and spreads are commonly produced by a process that encompasses the following steps:
  mixing of liquid oil, structuring fat and if present aqueous phase at a temperature at which the structuring fat is fully molten;
  cooling the mixture under high shear to induce crystallization of the structuring fat and to create an emulsion (if water is present);
  allowing the formation of a fat crystal network to stabilize the resulting emulsion and to impart a degree of firmness;
  modification of the crystal network to control firmness, plasticity and water droplet size of the final product.

These steps are usually conducted in a so called churn process or votator process. The churn process and the votator process are described in the Ullmans Encyclopedia, Fifth Edition, Volume A 16, pages 156-158. The energy consumption of these processes is substantial.

WO 2005/014158 describes a process for the preparation of an edible dispersion comprising oil and structuring agent and one or more of an aqueous phase and/or a solid phase, in which the dispersion is formed by mixing oil, solid structuring agent particles and the aqueous phase and/or the solid phase, wherein the solid structuring agent particles have a microporous structure of submicron size particles. The solid structuring agent particles are produced by preparing a homogeneous mixture of structuring agent and liquefied gas or supercritical gas at a pressure of 5-40 MPa and expanding the mixture through an orifice, under such conditions that a spray jet is formed in which the structuring agent is solidified and micronized.

The structuring agent particles described in WO 2005/014158 offer the advantage that they enable substantial energy savings to be realized in the production of fat-continuous food products such as spreads and shortenings.

The freely settled density of the structuring agent particles according to WO 2005/014158 typically lies in the range of 10-200 g/l. Shipping and storing materials with such a low density is relatively expensive. Hence, there is a need for a structuring agent that combines the advantages of the structuring agent particles of WO 2005/014158 with a substantially higher density.

WO 2006/087092 describes granules comprising:
  a) solid micronized lipid powder particles that have a microporous structure; and
  b) a liquid;
  wherein the granule is an agglomeration of said lipid particles. These granules are produced by spraying a sticky liquid onto micronized fat powder to glue the particles of the fat powder together.

SUMMARY OF THE INVENTION

The inventors have unexpectedly discovered that an oil structuring agent having a substantially higher density than a microporous fat powder according to WO 2005/014158 can be produced efficiently at high throughput without adversely affecting its oil structuring capacity by compacting the latter microporous fat powder in a special extruder under controlled conditions. More particularly, the inventors have found that this can be achieved by:
  feeding the microporous fat powder into the feed zone of an extruder having a forwarding screw and a barrel within which said screw is centrally positioned;
  rotating said forwarding screw to advance said fat powder feed through a compacting zone of the extruder where the barrel comprises a plurality of venting openings having a shorter dimension that exceeds the volume weighted average diameter of the fat powder feed and that is less than 10 mm; and
  expelling the compacted fat powder from the extruder;
  wherein the temperature of the fat powder during passage through the extruder is maintained below 40° C. and wherein the compaction factor achieved exceeds 1.5

The use of extruders for compacting powders is known in the art. GB-A 2 208 378 describes a deaerator for particulate materials comprising a cylindrical body having a charge port at one end and a discharge port at the other end, and a screw conveyor rotatably mounted within the body and arranged to transport particulates from the charge port to the discharge port on rotation, the body having a portion intermediate its ends which is perforated and which includes a filter, the intermediate portion being surrounded by an outer cylinder to define an evacuation chamber therebetween, the evacuation chamber having an evacuation opening and a compressed-air opening, the screw conveyor being so arranged that the space afforded by the screw thread of the conveyor reduces at least in the downstream region beyond the end of the intermediate portion of the body. Particulate material which is still at a low bulk density is charged through the charge portion to the cylindrical body, the screw conveyor transfers the material towards the discharge port in the transfer chamber defined between the cylindrical body and screw conveyor, during which the material is subjected to suction through the evacuation pipe and the evacuation chamber formed between the perforated cylindrical section and the outer cylinder, so that the air in the material may be removed.

Example 1 of GB 2 208 378 describes deaeration of an unspecified particulate having a bulk density of 0.035 g/cm$^3$ using a screw conveyor having a screw pitch which gradually decreased from 110 mm to 75 mm, and by applying vacuum to remove air through the perforated cylindrical section. Thus, an increase in bulk density of more than a factor 3 is achieved.

The oil-structuring properties of the microporous fat powder that is used as a starting material in the present process is believed be to associated with the micropores present in the fat particles, notably the high surface area provided by these micropores. It is unexpected that such a microporous fat powder can be compacted in an extruder without significant loss of oil-structuring capacity as one would expect the pressures exerted in the extruder to destroy micropores and to cause the formation of agglomerates. Surprisingly, however, the present process makes it possible to achieve compaction factors of 3.0 or more without substantial loss in oil-structuring capacity. Furthermore, the present process offers the advantage that the process can be operated at very high throughput without loss of compaction efficiency or oil-structuring capacity.

DE 32 20 916 describes a roller press for compacting pulverulent or fine-crystalline materials. The materials are delivered by a conveyor screw into the roller nip of the roller press. Immediately before the roller nip, the delivery channel of the delivery section is surrounded by a porous sleeve of sintered material, which sleeve forms the inner shell of a chamber which is under vacuum. The air released by the increasing compaction of the material being conveyed is extracted via the sleeve, so that even pulverulent or fine-crystalline material, which can otherwise hardly be processed, can be processed at a high degree of compaction. The roller press according to DE 32 20 916 is particularly suited for processing very small particulates (<10 μm).

The present process employs an extruder whose barrel comprises a plurality of venting openings in the part of the extruder where compaction occurs. A critical element of the process lies in the dimensions of the venting openings. These venting openings have a shorter dimension that exceeds the volume weighted average diameter of the fat powder. Despite the relatively large size of the venting openings, relatively little fat powder goes through these venting openings during compaction whilst air escapes very efficiently without the need of vacuum. Furthermore, it was found that when the fat powder that exits the compacting zone through the venting opening is (re)combined with the compacted fat powder that is expelled axially from the extruder, the overall compaction factor can still be sufficient.

The invention also provides a compacted microporous fat powder that has oil structuring capacity, said a compacted microporous fat powder having the following characteristics:
  a fat content of at least 50 wt. %;
  a solid fat content at 20° C. ($N_{20}$) of least 10 wt. %;
  a freely settled density in the range of 90-600 g/l;
  a particle size distribution with at least 90 vol. % of the particles having a diameter in the range of 20 to 600 μm;
  a maximum $G'_i/G'_d$ ratio of more than 2.0, wherein G' represents the elastic modulus at 10° C. of a dispersion of 2 wt. % of the compacted fat powder in glycerol, and wherein the maximum ratio is determined by recording $G'_i$, whilst increasing the frequency from 0.1 to 15 s$^{-1}$, by subsequently recording $G'_d$ whilst decreasing said frequency from 15 to 0.1 s$^{-1}$, and by calculating the ratio $G'_i/G'_d$ at the frequency at which said ratio is highest.

Furthermore, the invention is concerned with the use of such a compacted microporous fat powder in the production of food products.

DETAILED DESCRIPTION OF THE INVENTION

Accordingly, one aspect of the invention relates to a process for compacting a microporous fat powder in an extruder, said microporous fat powder having the following characteristics:
  a fat content of at least 50 wt. %;
  a solid fat content at 20° C. ($N_{20}$) of least 10 wt. %;
  a freely settled density in the range of 10 to 200 g/l, preferably in the range of 20 to 150 g/l;
  a particle size distribution with at least 90 wt. % of the particles having a diameter in the range of 3 to 400 μm, preferably in the range of 5 to 300 μm; said process comprising:
  feeding the fat powder into the feed zone of an extruder having a forwarding screw and a barrel within which said screw is centrally positioned;
  rotating said forwarding screw to advance said fat powder feed through a compacting zone of the extruder where the barrel comprises a plurality of venting openings having a shorter dimension that exceeds the volume weighted average diameter of the fat powder feed and that is less than 10 mm; and
  expelling the compacted fat powder from the extruder;
  wherein the temperature of the fat powder during passage through the extruder is maintained below 40° C. and wherein the compaction factor achieved exceeds 1.5.

The term "fat" as used herein encompasses triglycerides, diglycerides, monoglycerides, free fatty acids, phospholipids and combinations thereof. Fat may be liquid or solid at ambient temperature.

The term "microporous" as used herein in relation to powders refers to a particulate fatty material that is made up of particles that comprise a plurality of pores, holes, and/or channels.

The solid fat content of a fat at a given temperature of x° C. ($N_x$) can be determined by NMR pulse technique using the procedure described in Fette, Seifen, Anstrichmittel 80, (1978), 180-186.

The "compaction factor" is defined herein as the ratio that is obtained when the freely settled density of the compacted powder obtained in the present process is divided by the freely settled density of the microporous fat powder that is used as a starting material in the same process. Thus, if the microporous fat powder that is used as a starting material has a freely settled density of 90 g/l and the compacted powder produced has a freely settled density of 240 g/l, the compaction factor equals 240/90=2.67.

Whenever reference is made herein to the melting point of a fat or a fat powder, said melting point is determined by ISO method 6321:2002 (Animal and vegetable fats and oils—Determination of melting point in open capillary tubes (slip point)).

The particle size distribution of compacted and non-compacted fat powders can suitably be determined with the help of a QICPIC™ image analysis sensor (ex Sympatec).

Besides fat the microporous fat powder may suitably contain minor amounts of other ingredients, such as flavouring, anti-oxidants, emulsifiers, vitamins, minerals and colouring.

Typically, the fat powder contains at least 80 wt. %, more preferably at least 90 wt. % and most preferably at least 95 wt. % of fat.

Triglycerides and diglycerides together typically represent at least 80 wt. %, more preferably at least 90 wt. % and most preferably at least 95 wt. % of the fat. According to a particularly preferred embodiment, triglycerides constitute at least 80 wt. %, more preferably at least 85 wt. % and most preferably at least 90 wt. % of the fat.

The benefits of the present invention are most pronounced in case a fat powder is employed that has a solid fat content at 20° C. ($N_{20}$) of at least 20 wt. %, more preferably of at least 35 wt. % and most preferably of at least 50 wt. %.

According to a particularly preferred embodiment the fat powder has a solid fat contents $N_{10}$ from 50 to 100, $N_{20}$ from 26 to 95 and $N_{35}$ from 5 to 60.

The fat powder employed in the present process typically has a melting point in excess of 35° C. More preferably, the fat powder has a melting point in excess of 40° C., even more preferably in excess of 44° C. and most preferably in excess of 48° C.

Advantageously, the fat powder of the present invention is a free flowing powder. According to a particularly preferred embodiment, the freely settled density of the fat powder lies in the range of 30 to 120 g/l.

The microporous fat powder that is fed into the feed zone of the extruder typically has a particle size distribution with at least 90 wt. % of the particles having a diameter in the range of 8 to 200 μm, In accordance with another preferred embodiment, the fat powder has a volume weighted average particle size in the range of 20 to 250 μm, more preferably in the range of 25 to 200 μm, and most preferably in the range of 30 to 150 μm.

In order to ensure that the oil-structuring properties of the fat powder are retained after compaction, it is important that not more than a minor fraction of the solid fat contained in the powder becomes molten during extrusion. Thus, in accordance with a preferred embodiment, the amount of solid fat that is molten during extrusion does not exceed 30%, preferably does not exceed 15% by weight of the fat powder.

Typically, during the compacting in the extruder the temperature of the microporous fat powder is maintained at a temperature that is at least 5° C., more preferably at least 10° C. and most preferably at least 15° C. below the melting point of the fat powder.

During the compacting in the extruder the temperature of the fat powder is advantageously maintained in the range of −5-25° C., more preferably in the range of 0-20° C. and most preferably in the range of 3-15° C.

The compaction factor achieved in the present process typically lies in the range of 1.5 to 10. Particularly good results are obtained with the present process if the compaction factor achieved lies in the range of 1.7 to 6, especially in the range of 1.9 to 3.0.

The compaction factor achieved in the process is largely determined by the extent to which the volume accommodated in the screw flights decreases in the (axial) direction of extrusion. A "screw flight" is the volume defined by adjacent screw threads completing one complete turn on the screw shaft. Compaction can be achieved in the compacting zone of the extruder by gradually decreasing the screw flight in the direction of extrusion. This may be achieved, for instance, by decreasing the pitch of the forwarding screw and/or by reducing the height of the thread of the forwarding screw in the same direction and/or by increasing the shaft diameter, all in the direction of extrusion.

In accordance with a preferred embodiment, within the compacting zone the screw flight decreases by at least a factor 1.5, more preferably by a factor 1.7 and most preferably by a factor 1.9 in the direction of extrusion. Typically, the screw flight decreases by not more than a factor 8 in the direction of extrusion. Even more preferably, the screw flight decreases by not more than a factor 6 in the direction of extrusion.

As explained herein before, the present process offers the advantage that it can be operated efficiently at high throughput. Advantageously, the present process is used to process at least 100 kg/hr, more preferably at least 300 kg/hr and most preferably at least 800 kg/hr of microporous fat powder.

In the present process effective compaction can be achieved when the forwarding screw is rotated at more than 5 rpm. Preferably, the forwarding screw is rotated at more than 15 rpm.

Most preferably, the forwarding screw is rotated at more than 40 rpm. Typically, the forwarding screw is rotated at not more than 400 rpm.

As explained herein before, the dimensions of the venting openings, especially the shorter dimension of these openings, are a critical feature of the present process. If the venting openings are too small clogging will occur. If the venting openings are too large compaction efficiency will be lost.

The venting openings in the compacting zone of the extruder have a shorter dimension that exceeds the volume weighted average diameter of the fat powder feed. According to a particularly preferred embodiment, at least 60 wt. %, more preferably at least 70 wt. % and most preferably at least 75 wt. % of the particles contained in the fat powder feed have a diameter that is less than the shorter dimension of the venting openings.

In accordance with a particularly preferred embodiment, the shorter dimension of the venting openings exceeds 50 μm. Even more preferably, the shorter dimension exceeds 100 μm. Typically, the shorter dimension does not exceed 10 mm. More preferably, said shorter dimension does not exceed 5 mm, most preferably it does not exceed 3 mm.

The venting openings comprised in the barrel of the extruder typically have an aspect ratio 1:1 to 10,000:1. More preferably the aspect ratio is in the range of 1:1 to 5,000:1, even more preferably in the range of 1:1 to 1,000:1.

In order to ensure that air can escape at an adequate rate, the barrel of the extruder used in the present process typically comprises at least 20 venting openings in the compacting zone. Even more preferably, the barrel contains at least 100 venting openings and most preferably it contains at least 200 venting openings.

Together, the venting openings typically represent less than 60% of the surface area of the barrel in the compacting zone. More preferably, the venting openings represent less than 50%, most preferably less than 40% of the surface area of the barrel. The venting openings typically represent at least 3%, more preferably at least 5% and most preferably at least 10% of the surface area of the barrel in the compacting zone.

As explained herein before, despite the fact that the venting openings in the barrel are larger than most of the particles contained in the fat powder, not more than a minor fraction of the fat powder goes through the venting opening in the present process. Typically, less than 30 wt. %, even more preferably less than 20 wt. % and most preferably less than 15 wt. % of the fat powder feed that is advanced through the compacting zone exits the barrel through the venting openings.

As explained herein before, it was found that when the fat powder that exits the compacting zone through the venting opening is (re)combined it with the compacted fat powder that is expelled axially from the extruder, the overall compaction factor can still be sufficient. Thus, in accordance with a particularly preferred embodiment of the present process, the fat powder that leaves the compaction zone through the venting openings is combined with the compacted fat powder that is expelled from the extruder. Advantageously, said combining comprises mixing of the two fat powders.

The compacted fat powder obtained in the present process typically has a freely settled density of at least 90 g/l, more preferably of 120 to 600 g/l, even more preferably of 130 to 400 g/l and most preferably of 150 to 300 g/l.

In order to ensure that friction heat does not cause the fat powder to melt during extrusion, it is preferred that the barrel and/or the forwarding screw are actively cooled during the process.

Unlike the extrusion process described in GB 2 208 378 no suction needs to be applied to remove gas through the venting openings. Thus, advantageously the extruder employed in the present process does not comprise an evacuation chamber as described herein before in relation to GB-A 2 208 378.

Another aspect of the present invention relates to a compacted microporous fat powder having the following characteristics:
- a fat content of at least 50 wt. %;
- a solid fat content at 20° C. ($N_{20}$) of least 10 wt. %;
- a freely settled density in the range of 90-600 g/l;
- a particle size distribution with at least 90 vol. % of the particles having a diameter in the range of 20 to 600 μm;
- a maximum $G'_i/G'_d$ ratio of more than 2.0, wherein G' represents the elastic modulus at 10° C. of a dispersion of 2 wt. % of the compacted fat powder in glycerol, and wherein the maximum $G'_i/G'_d$ ratio is determined by recording $G'_i$ whilst increasing the frequency from 0.1 to 15 s$^{-1}$, by subsequently recording $G'_d$ whilst decreasing said frequency from 15 to 0.1 s$^{-1}$, and by calculating the ratio $G'_i/G'_d$ at the frequency at which said ratio is highest.

The inventors have found that the compacted microporous fat powder of the present invention comprises agglomerates that are composed of fat particles that are loosely bound together. If these agglomerates are subjected to conditions of mild shear, the agglomerates break up (de-agglomeration). It is believed that the oil structuring capacity of the compacted microporous fat powder is largely determined by the non-agglomerated fat particles and that the compacted fat powder has retained this capacity because the fat particles are quickly released form the agglomerates when the compacted fat powder is dispersed in a liquid and the resulting slurry is subjected to shear (e.g. stirring).

The presence of agglomerates of fat particles that easily break up under conditions of mild shear is reflected by the requirement that the $G'_i/G'_d$ ratio exceeds 2.0.

The elastic modulus G' is the mathematical description of an object or substance's tendency to be deformed elastically (i.e., non-permanently) when a force is applied to it. The elastic modulus of an object is defined as the slope of its stress-strain curve in the elastic deformation region: $\lambda$=stress/strain wherein lambda ($\lambda$) is the elastic modulus; stress is the restoring force caused due to the deformation divided by the area to which the force is applied; and strain is the ratio of the change caused by the stress to the original state of the object.

G' of the present compacted powder is determined by placing a sample of the powder-in-glycerol dispersion between two oscillating plates that have been equilibrated at 10° C. G' is determined as a function of frequency, using an upward sweep of 0.1 to 15 Hz to monitor $G'_i$, followed by a downward sweep from 15 to 0.1 Hz to monitor $G'_d$. The oscillating plates exert a certain amount of shear that increases with frequency. The agglomerated fat particles contained in the compacted powder of the present invention are gradually broken up as the oscillation frequency increases. As a result, the G' values measured at lower frequencies during the downward sweep are substantially lower than those that were measured at these same frequencies during the upward sweep. In contrast, for non-compacted powders the G' curves of the upward and downward sweep are essentially identical.

According to a particularly preferred embodiment, the $G'_i/G'_d$ ratio is at least 2.5, more preferably at least 3.0 and most preferably at least 4.0. Preferably, the compacted powder exhibits the latter ratio's at a frequency of 1 Hz, using the oscillation procedure described herein before.

The preferred fat contents and solid fat contents for the compacted microporous fat powder are identical to those already mentioned herein before in relation to the (non-compacted) fat powder.

Unlike the granulates described in WO 2006/087092 the compacted fat powder of the present invention is not made of agglomerates of fat particles that are held together by a sticky liquid, such as edible oil or a water-in-oil emulsion. The present compacted fat powder typically contains less than 30 wt. %, more preferably less than 20 wt. %, even more preferably less than 10 wt. % and most preferably less than 5 wt. % of free liquid oil.

In accordance with another preferred embodiment, the compacted fat powder contains less than 30 wt. %, more preferably less than 20 wt. %, even more preferably less than 10 wt. % and most preferably less than 5 wt. % of ingredients other than solid fat particles.

WO 2010/069746 and WO 2010/069750 describe microporous fat powders that may be used as oil-structuring agents. Unlike the fat powders described in these international patent applications, the compacted fat powder of the present invention typically has a full width at half maximum of the first order long spacing X-diffraction peak that is less than 0.00056×free flowing density+0.213.

The compacted microporous fat powder of the present invention is preferably obtainable, or even more preferably obtained by a compacting process as defined herein before.

Another aspect of the invention relates to the use of the compacted microporous fat powder as defined herein before as an oil-structuring agent, especially an oil-structuring agent for food products that contain at least 5 wt. % of liquid oil. Most preferably, the compacted fat powder is used as an oil-structuring agent in fat-continuous food products.

Yet another aspect of the present invention relates to a process of preparing a food product, said process comprising mixing the compacted microporous fat powder as defined herein before with liquid oil.

Typically, the compacted microporous fat powder is combined with the liquid oil in a weight ratio that lies in the range of 1:100 to 40:100, more preferably within the range of 3:100 to 25:100 and most preferably in the range 6:100 to 18:100.

The present process preferably comprises packaging of the final food product. According to a particularly preferred embodiment, the temperature of the mixture of compacted microporous fat powder and liquid oil is kept below the melting point of the fat powder until the product is packaged.

The food product obtained in the present process typically comprises at least 18 wt. % of a continuous fat phase.

Examples of food product that may suitably be produced by the present process include spreads, kitchen margarines, bakery margarines and shortenings.

The invention is further illustrated by means of the following non-limiting examples.

EXAMPLES

Determination of the $G'_i/G'_d$ Ratio

A dispersion of fat powder in glycerol is prepared by adding 1 gram of fat powder to 49 grams of glycerol and by gently mixing the two components with a spatula (all ingredients being previously equilibrated at 5° C.). Next, about 3 grams of the slurry so obtained is placed on the bottom plate of a Peltier-controlled Rheometer (AR 2000, TA Instruments) which is thermostated at 10° C. The upper plate used in the Rheometer has a sand-blasted surface and a diameter of 40 mm.

The gap size between the two oscillating plates is to be chosen carefully when determining the maximum $G'_i/G'_d$ ratio. The G' measurements described herein before should be performed with gap sizes of 200, 300 and 500 µm, and the gap size yielding the highest $G'_i/G'_d$ ratio should be used for the final result.

The maximum $G'_i/G'_d$ ratio is determined within the frequency range of 0.3 to 10 Hz.

Comparative Example A

A microporous fat powder was produced from an interesterified fat using the Super Critical Melt Micronisation methodology described in WO 2005/014158. The interesterified fat was a randomly interesterified blend of multifractionated palm oil stearin having an IV of 14 (65 wt. %) and palm kernel oil (35 wt. %). The microporous fat powder so obtained had the properties described in Table 1.

TABLE 1

| | |
|---|---|
| Freely settled density | 60-80 g/l |
| Volume weighted average diameter | appr. 70 µm |
| Melting point | 48° C. |
| $N_{20}$ | 82.5% |

Compaction experiments were carried out in a cooled room at 5° C. The equipment was left long enough in this room to cool down to 5° C. The in-feed powder was stored at 5° C. and had a temperature of ca. 5° C.

Extrusion compaction was carried out in an AZODOS extruder comprising an extrusion screw with an external diameter of 55 mm (AZO Inc.). This particular extruder is a dosing system with a constant pitch and a pneumatically operated flat-shaped shut-off valve that can be used to give counter pressure for compaction.

A first trial resulted in compaction factors ranging from 3.2-4.8 at a throughput up to ca. 6.1 kg/hr. The counter pressure needed to be low, ca. 0.5 bar, in order to prevent shut-off. The in-feed section needed manual mixing in order to prevent bridging and pit-holes.

Comparative Example B

Comparative Example A was repeated except that this time a screw with varying pitch was used. The pitch at the in-feed section of the screw was increased from ca. 30 mm to 60 mm. At the compaction side the pitch decreased from 60 mm to appr. 20 mm.

This resulted in a relatively constant compaction factor of 2.2-2.3 at throughputs from 4.6 to 8.1 kg/hr. The throughput increases with the rotational speed of the screw. At screw speeds higher than ca. 50 rpm, sufficient compaction was lost and/or the throughput did not increase significantly anymore.

Example 1

Comparative Example B was repeated with the exception that the barrel of the extruder was replaced with a barrel containing a perforated stainless steel tube section having the properties described in Table 2.

TABLE 2

| | |
|---|---|
| Shape of the perforations | Circular |
| Shortest dimension of perforations | 1.5 mm |
| Wall thickness of the perforated section | 1.5 mm |
| Percentage surface perforated | 31% |
| Length of perforated section | 285 mm |

The manual mixing in the in-feed section was replaced by an automated in-feed mixer. The pitch at the in-feed section of the screw was increased from ca. 30 mm to 60 mm. At the compaction side the pitch decreased from ca. 60 mm to ca. 12 mm.

A constant compaction factor of 2.4-2.5 could be achieved at throughputs of up to 21.2 kg/hr (112 rpm). Temperature of the fat powder was found to increase around 3-4° C. in the compaction zone of the extruder.

The amount of fat powder that exited the extruder through the perforations in the extruder barrel was less than 15% by weight of the feed. This powder was mixed with the compacted fat powder that was expelled axially by the extruder. The compaction factors mentioned are measured from the combined out-feed.

Example 2

Example 1 was repeated, except that this time the feed consisted of a freshly produced fat powder instead of a fat powder that had been stored at 5° C.

Compaction extrusion was started within 3 minutes after the powder had been produced. The powder at the in-feed section for compaction had a temperature of approximately 7° C.

The compaction factor and throughputs realized were very similar to those described in Example 1.

Example 3

Example 2 was repeated, except that the extruder was replaced with a similar extruder that can be operated at higher throughputs as the external screw diameter was 90 mm (instead of 55 mm). The pitch of the screw of this extruder decreased from 100 mm to ca. 25 mm in the compaction zone. The length of the perforated section was 300 mm.

Compaction extrusion was started approximately 15 minutes after the last powder had been produced. The powder at the in-feed section for compaction had a temperature of approximately 10° C.

A constant compaction factor of about 2.2 could be realized at throughputs of up to 190 kg/hr (157 rpm). Temperature of the fat powder was found to increase around 4° C. in the compaction zone of the extruder.

Example 4

The compacted powders described in Example 1 and 3, were used to produce a spread, using the recipe (Composition B) and process described in the Examples of WO 2010/069746. A reference spread was produced using the non-compacted powder instead of the compacted powder.

It was found that compaction had a negligible effect on the spread quality. The water droplets in the spread produced with the compacted powder were in some cases slightly larger than those in the reference spread. However, this difference could be negated very easily by increasing the speed of the C-unit (pin stirrer).

Example 5

The compacted powder described in Example 3 and the fat powder that was used as a starting material for the production of that compacted powder were both subjected to a rheological test as described herein before (using a gap space of 300 μm) to determine the maximum $G'_i/G'_d$ ratio.

The results so obtained are summarized in Table 3.

TABLE 3

| Frequency (in Hz) | G' | | | | $G'_i/G'_d$ ratio | |
|---|---|---|---|---|---|---|
| | Compacted | | Non-compacted | | | Non- |
| | Up | Down | Up | Down | Compacted | compacted |
| 0.29 | 67.9 | 10.4 | 24.0 | 24.4 | 6.5 | 1.0 |
| 0.48 | 78.0 | 9.8 | 20.9 | 15.1 | 7.9 | 1.4 |
| 0.85 | 82.4 | 10.9 | 18.2 | 16.1 | 7.6 | 1.1 |
| 1.23 | 87.1 | 12.4 | 17.0 | 17.2 | 7.0 | 1.0 |
| 1.99 | 82.8 | 14.6 | 16.7 | 19.6 | 5.7 | 0.9 |
| 3.12 | 75.2 | 17.7 | 18.3 | 22.1 | 4.3 | 0.8 |
| 5.00 | 51.9 | 21.1 | 21.7 | 25.9 | 2.5 | 0.8 |
| 8.02 | 39.2 | 26.7 | 27.1 | 30.9 | 1.5 | 0.9 |
| 12.9 | 44.4 | 36.7 | 35.0 | 35.7 | 1.2 | 1.0 |

This data shows that the maximum $G'_i/G'_d$ ratio for the compacted powder was 7.9, whereas the maximum $G'_i/G'_d$ ratio for the non-compacted powder was only 1.4.

The invention claimed is:

1. A compacted microporous fat powder, comprising:
   a fat content of at least 50 wt. %;
   a solid fat content at 20° C. ($N_{20}$) of at least 10 wt. %;
   a free flowing density in the range of 90-600 g/l;
   a particle size distribution with at least 90 vol. % of the particles having a diameter in the range of 3 to 400 μm;
   a maximum $G'_i/G'_d$ ratio of more than 2.0,
   wherein G' represents the elastic modulus at 10° C. of a dispersion of 2 wt. % of the compacted fat powder in glycol, and wherein the maximum $G'_i/G'_d$ ratio is determined by recording $G'_i$ while increasing the frequency from 0.1 to 15 s$^{-1}$, by subsequently recording $G'_d$ while decreasing said frequency from 15 to 0.1 s$^{-1}$, and by calculating the ratio $G'_i/G'_d$ at the frequency at which said ratio is highest;
   wherein the compacted microporous fat powder has a full width at half maximum of the first order long spacing X-diffraction peak that is less than 0.00056× free flowing density +0.213.

2. The compacted microporous fat powder of claim 1, wherein the $G'_i/G'_d$ ratio is at least 2.5.

3. The compacted microporous fat powder of claim 1, wherein the $G'_i/G'_d$ ratio is at least 3.0.

4. The compacted microporous fat powder of claim 1, wherein the compacted microporous fat powder contains less than 30 wt. % of ingredients other than solid fat particles.

5. The compacted microporous fat powder of claim 1, wherein the compacted microporous fat powder contains less than 30 wt. % of free liquid oil.

6. A food product comprising the compacted microporous fat powder of claim 1 and an oil, wherein the compacted microporous fat powder is combined with the liquid oil in a weight ratio in the range of 1:100 to 40:100.

7. The food product of claim 6, wherein the food product comprises at least 18 wt. % of a continuous fat phase.

8. The food product of claim 6, wherein the food product comprises a spread, margarine, or shortening.

9. A method of producing a food product, comprising the step of:
   mixing the compacted microporous fat powder of claim 1 with a liquid oil to produce the food product, wherein the compacted microporous fat powder is combined with the liquid oil in a weight ratio within the range of 1:100 to 40:100.

10. The method of claim 9, further comprising the following step:
    packaging the food product, wherein the mixture comprising the compacted microporous fat powder and the oil is maintained at a temperature below the melting point of the fat powder until the food product is packaged.

11. The compacted microporous fat powder of claim 1, wherein the compacted microporous fat powder was produced by an extruder configured to have a barrel comprising a plurality of venting openings having a shorter dimension that exceeds the volume weighted average diameter of an input fat powder feed and that is less than 10 mm.

12. The compacted microporous fat powder of claim 1, wherein the $G'_i/G'_d$ ratio is at least 4.0.

* * * * *